(12) United States Patent
Swix et al.

(10) Patent No.: US 8,352,372 B1
(45) Date of Patent: Jan. 8, 2013

(54) SOFTWARE CONDITIONAL ACCESS SYSTEM FOR A MEDIA DELIVERY NETWORK

(75) Inventors: Scott Swix, Duluth, GA (US); P. Thomas Watson, Alpharetta, GA (US); Randy S. Zimler, Gainesville, GA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 1794 days.

(21) Appl. No.: 09/963,779

(22) Filed: Sep. 26, 2001

Related U.S. Application Data

(60) Provisional application No. 60/281,207, filed on Apr. 2, 2001.

(51) Int. Cl.
*G06F 17/00* (2006.01)
(52) U.S. Cl. .................... 705/56; 705/59; 725/86
(58) Field of Classification Search ............ 705/26, 705/50–54, 56, 59; 725/86
See application file for complete search history.

(56) References Cited

U.S. PATENT DOCUMENTS

| | | | | |
|---|---|---|---|---|
| 5,029,206 | A * | 7/1991 | Marino et al. | 713/164 |
| 5,247,347 | A | 9/1993 | Litteral et al. | |
| 5,440,335 | A | 8/1995 | Beveridge | |
| 5,864,620 | A * | 1/1999 | Pettitt | 705/54 |
| 5,926,624 | A * | 7/1999 | Katz et al. | 709/217 |
| 5,991,399 | A * | 11/1999 | Graunke et al. | 380/279 |
| 6,073,124 | A * | 6/2000 | Krishnan et al. | 705/59 |
| 6,236,989 | B1 * | 5/2001 | Mandyam et al. | 707/4 |
| 6,269,150 | B1 | 7/2001 | Herrbach et al. | |
| 6,282,575 | B1 * | 8/2001 | Lin et al. | 709/244 |
| 6,289,455 | B1 * | 9/2001 | Kocher et al. | 713/194 |
| 6,304,982 | B1 | 10/2001 | Mongan et al. | |
| 6,385,596 | B1 * | 5/2002 | Wiser et al. | 705/51 |
| 6,445,907 | B1 | 9/2002 | Middeke et al. | |
| 6,546,392 | B1 * | 4/2003 | Bahlmann | 707/9 |
| 6,580,718 | B1 * | 6/2003 | Chapman | 370/409 |
| 6,760,918 | B2 | 7/2004 | Rodriguez et al. | |
| 2002/0059627 | A1 | 5/2002 | Islam et al. | |

OTHER PUBLICATIONS

U.S. Appl. No. 09/893,332, filed Jun. 27, 2001, entitled "Local Account Manager for a Media Delivery Network", Inventors: Swix et al.
U.S. Appl. No. 09/892,727, filed Jun. 27, 2001, entitled "Remote Diagnostic Tool for a media Delivery Network", Inventors: Swix et al.

* cited by examiner

*Primary Examiner* — Calvin Hewitt
*Assistant Examiner* — John M Winter
(74) *Attorney, Agent, or Firm* — Cantor Colburn LLP

(57) ABSTRACT

A software conditional access system (CAS) for media services provided to a Media Distribution Device, such as a set top box (STB), is disclosed. The STB may be connected to a Media Delivery Service Provider via a broadband connection. Over the broadband connection, a CAS application may be downloaded to the STB, maintained and dynamically updated. Because the CAS is implemented by software on the STB, it is inexpensive to install, maintain and update. When a user desires to purchase media services through the STB, a request, with identifying information, is sent to the Media Delivery Service Provider via the broadband connection. The service provider cross-references the identifying information with a user's account to determine whether to allow the user to view the media service requested. If the service provider determines to allow the user to view the media service, the user's account (typically maintained by the service provider) is charged and a key is downloaded via the broadband connection to the STB. The key allows the user to view the requested media service to be presented for user viewing, hearing or other use. After the requested media service ends, after a predetermined amount of time, etc., the CAS application may delete the key.

10 Claims, 4 Drawing Sheets

SOFTWARE CONDITIONAL ACCESS SYSTEM FOR A MEDIA DELIVERY NETWORK

RELATED APPLICATIONS

This application claims the benefit of U.S. Provisional Application No. 60/281,207 filed Apr. 2, 2001.

FIELD OF THE INVENTION

The present invention generally relates to a media delivery network. More particularly, the present invention relates to a software conditional access system for a media delivery network.

BACKGROUND OF INVENTION

More than ever before, residential consumers are being provided with a wealth of media resources. While cable television, the Internet, and on-demand media have been available for years, recently developed high-speed broadband technologies are enhancing the delivery of these media services. These technologies have made it possible to increase the variety of available media services and to enhance the ability of the user to interact with the media delivery system to tailor media delivery to the user's preferences. Satellite communications, asymmetric digital subscriber lines (ADSL), and broadband cable are providing new high-throughput connections to media delivery services. Media services consumers are commonly establishing wireless connections to satellites, telephony-based connections to ADSL, and broadband cable connections to the media service providers. Typically, these connections are processed by a Media Distribution Device that processes media content and data and routes the media and/or data to media presentation devices, such as a television or personal computer. A conventional Set-top Box (STB) is an example of a Media Distribution Device.

A Conditional Access System (CAS) may be used to restrict the delivery or viewing of media services. For example, a CAS may be used to prohibit a cable television (CATV) or satellite television viewer from viewing a certain pay-per-view event unless the viewer has paid to view the event. Traditionally, the CAS has required hardware smartcard technology. One such CAS has an access-enabling card (a smartcard) that is inserted into a Media Distribution Device and is able to decrypt data to view an event when the user has paid to view the event. The smartcard also includes account and billing information that is periodically uploaded via a phone line to the media service provider. For example, when a user purchases a pay-per-view event, a flash memory of the smartcard may be updated to reflect that the user purchased the event. The smartcard may provide decryption of the pay-per-view event and allow the user to view the purchased event. At a later time, such as during the early morning, the Media Distribution Device may connect via a phoneline to a billing system to update the billing system with the billing information from the smartcard. This type of CAS may be referred to as a hardware CAS because it includes a piece of hardware (smartcard) at the Media Distribution Device that is used to provide conditional access.

Although a hardware CAS works fairly well, it does have some problems. One problem is that a hardware CAS costs a great deal of money to implement, maintain and update. For example, a smartcard may cost around ten dollars. Periodically, updated smartcards need to be provided to all customers. A CATV or satellite service provider may have millions of customers. Thus, the costs of providing updated smartcards are great. Moreover, customer support must be provided to help users who have difficulty installing their new smartcards. Also, some customers may become frustrated and cancel their service, resulting in lost revenues. Moreover, the cost of smartcard readers, smartcard media and the administration process for managing smartcard distribution is high on a per device basis. Thus, a hardware CAS is expensive to implement and maintain.

Another problem with a hardware CAS is fraud. Smartcards may be cloned, hacked, stolen, duplicated, moved, etc. and these cards may be used to receive media services without paying the proper revenue to the media service providers. Even if a smartcard is not tampered with, the billing system is only periodically updated by a user's Media Distribution Device. Thus, a clever and devious user may view a pay-per-view event, but then disconnect the telephone line from their Media Distribution Device before the Media Distribution Device dials the service provider. Thus, a user may be able to delay or circumvent payment for media services due to deficiencies in the hardware CAS technology.

SUMMARY OF THE INVENTION

In one embodiment, the invention is a software conditional access system (CAS) for media services provided to a Media Distribution Device, such as a set top box (STB). The STB may be connected to a Media Delivery Service Provider via a broadband connection. Over the broadband connection, a CAS application may be downloaded to the STB, maintained and dynamically updated. Because the CAS is implemented by software on the STB, it is inexpensive to install, maintain and update.

When a user desires to purchase media services through the STB, a request is sent to the Media Delivery Service Provider via the broadband connection. A part of the request may be identifying information of the STB. For example, the MAC address of the STB or the hardware serial number of the STB may be sent with the request. The service provider then cross-references the identifying information with a user's account to determine whether to allow the user to view the media service requested. If the service provider determines to allow the user to view the media service, the user's account (typically maintained by the service provider) is charged and a key is downloaded via the broadband connection to the STB. Thus, there is no lag time between a user purchasing the media service and the user being charged for the media service.

The key allows the user to view the requested media service. For example, the key may be software that is programmed to decrypt the requested media service for viewing. After the requested media service ends, after a predetermined amount of time, etc., the CAS application may delete the key.

The various aspects of the present invention may be more clearly understood and appreciated from a review of the following detailed description of the disclosed embodiments and by reference to the drawings and claims.

DETAILED DESCRIPTION

In one embodiment, the invention is a software conditional access system (CAS) for media services provided to a Media Distribution Device, such as a set top box (STB). The STB may be connected to a Media Delivery Service Provider via a broadband connection. Over the broadband connection, a CAS application may be downloaded to the STB, maintained and dynamically updated. Because the CAS is implemented by software on the STB, it is inexpensive to install, maintain and update.

When a user desires to purchase media services through the STB, a request is sent to the Media Delivery Service Provider via the broadband connection. A part of the request may be identifying information of the STB. For example, the MAC address of the STB or the hardware serial number of the STB may be sent with the request. The service provider then cross-references the identifying information with a user's account to determine whether to allow the user to view the media service requested. If the service provider determines to allow the user to view the media service, the user's account (typically maintained by the service provider) is charged and a key is downloaded via the broadband connection to the STB. Thus, there is no lag time between a user purchasing the media service and the user being charged for the media service.

The key allows the user to view the requested media service. For example, the key may be software that is programmed to decrypt the requested media service for viewing. After the requested media service ends, after a predetermined amount of time, etc., the CAS application may delete the key.

Having briefly described embodiments of the present invention above, a block diagram of an exemplary operating environment will be described below in reference to FIG. 1.

Figure 1:
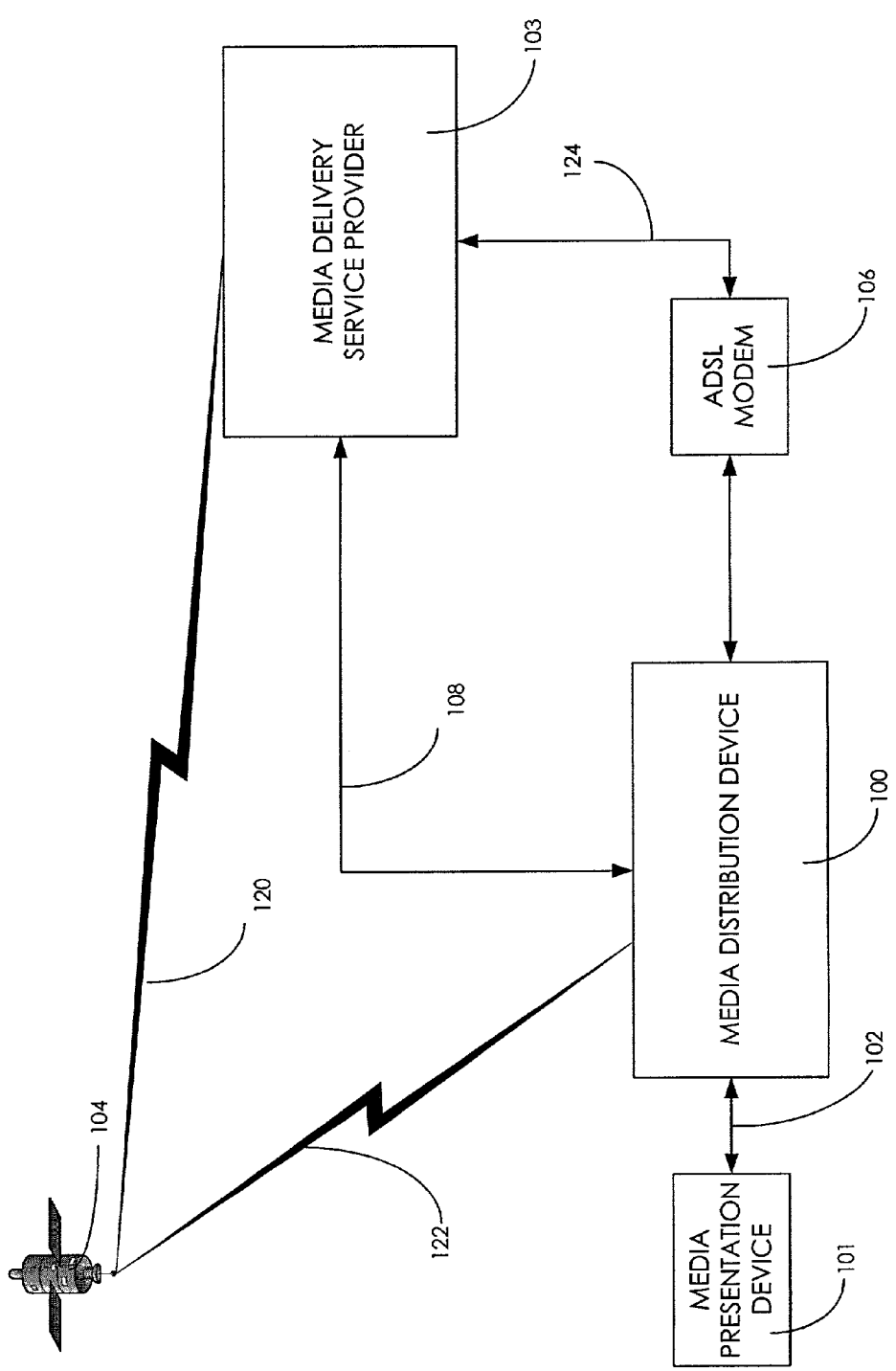
FIG. 1 is a block diagram of an exemplary operating environment in which embodiments of the present invention may be implemented.

FIG. 1 is a block diagram of an exemplary operating environment in which embodiments of the present invention may be implemented. Media content is typically delivered to a customer by means of a Media Distribution Device 100. The most common Media Distribution Devices are conventional Set-Top Boxes (STBs). The Media Distribution Device (MDD) 100 can provide media content and/or data to a media presentation device 101 over a communication link 102. The most common example of a media presentation device 101 is a conventional television, although a stereo or home theater system would also represent a media presentation device if audio content is to be purchased and played via an implementation of the invention. Typically, the MDD 100 will deliver media content only to media presentation device 101. However, newer-generation media presentation devices 101 have the ability to process data received from the Media Distribution Device 100. Such data may include information pertaining to the presentation of the media content on the media presentation device 101.

Another example of a media presentation device 101 is a conventional personal computer. The personal computer can receive media content, such as Internet content from the Media Distribution Device 100 and present it to a customer/user. As is well known, a personal computer can also process data received from the Media Distribution Device 100 to format the presentation of the delivered media content.

The MDD 100 can receive media content and data from one or more sources. In the example of FIG. 1, the MDD 100 is depicted receiving media and data from a Media Delivery Service Provider 103. Examples of a Media Delivery Service Provider are a cable T.V. provider, a satellite T.V. provider, an Internet service provider, and a telephone service provider. Notably, the media content and data may be delivered over a single communication link or may be delivered over separate communication links.

In the example of FIG. 1, the Media Delivery Service Provider 103 can provide media content and data to the MDD 100 via an Asymmetric Digital Subscriber Line (ADSL) modem 106. The Media Delivery Service Provider 103 may also provide media content and data to the MDD 100 via a satellite 104. The satellite can deliver media content and data directly to the MDD 100 over a communications link 122. Such a direct link usually involves the use of a small satellite dish in conjunction with the MDD 100. The satellite 104 can also deliver the media content and data to the Media Delivery Service Provider 103 via another communication link 120. This media content and data may be rerouted to the MDD 100 from the Media Delivery Service Provider 103 over a separate communication link.

The MDD 100 may also have a direct communication link 108 with the Media Delivery Service Provider 103. Such a link might be a conventional 2400-baud modem connection to the Media Delivery Service Provider 103. This communication link 108 may also be a direct hardwire connection or a network connection, such as an Ethernet connection.

In any event, the MDD 100 receives media content and data from a Media Delivery Service Provider 103 and delivers the media content and/or data to the media presentation device 101 for presentation to the customer. Typically, the MDD 100 can communicate in two-directions over the communication links 108 and 124. That is, the MDD 100 can respond to queries and/or commands received from the Media Delivery Service Provider 103 and return data and/or messages, in response to the receipt of a query or command. The Simple Network Management Protocol (SNMP) is a standard that has been developed to standardize such two-way communication between the MDD 100 and the Media Delivery Service Provider 103. Typically, an SNMP agent will be installed in the MDD 100 and will coordinate all SNMP communications between the MDD 100 and the Media Delivery Service Provider 103. Applications operating on either servers within the Media Delivery Service Provider 103, or within the Media Distribution Device 100, may also communicate directly via TCP/IP or other proprietary protocol as appropriate for the applications needs. The specific protocol of communication is not material to the implementation of the invention. Notably, such two-way communications are not currently available over communications link 122 with the satellite 104.

The Media Delivery Service Provider 103 may also use an exemplary embodiment of the present invention to upload software, media content, and/or data to the Media Distribution Device 100 or the media presentation device 101. This upload can be automatic or in response to a customer request.

Figure 2:
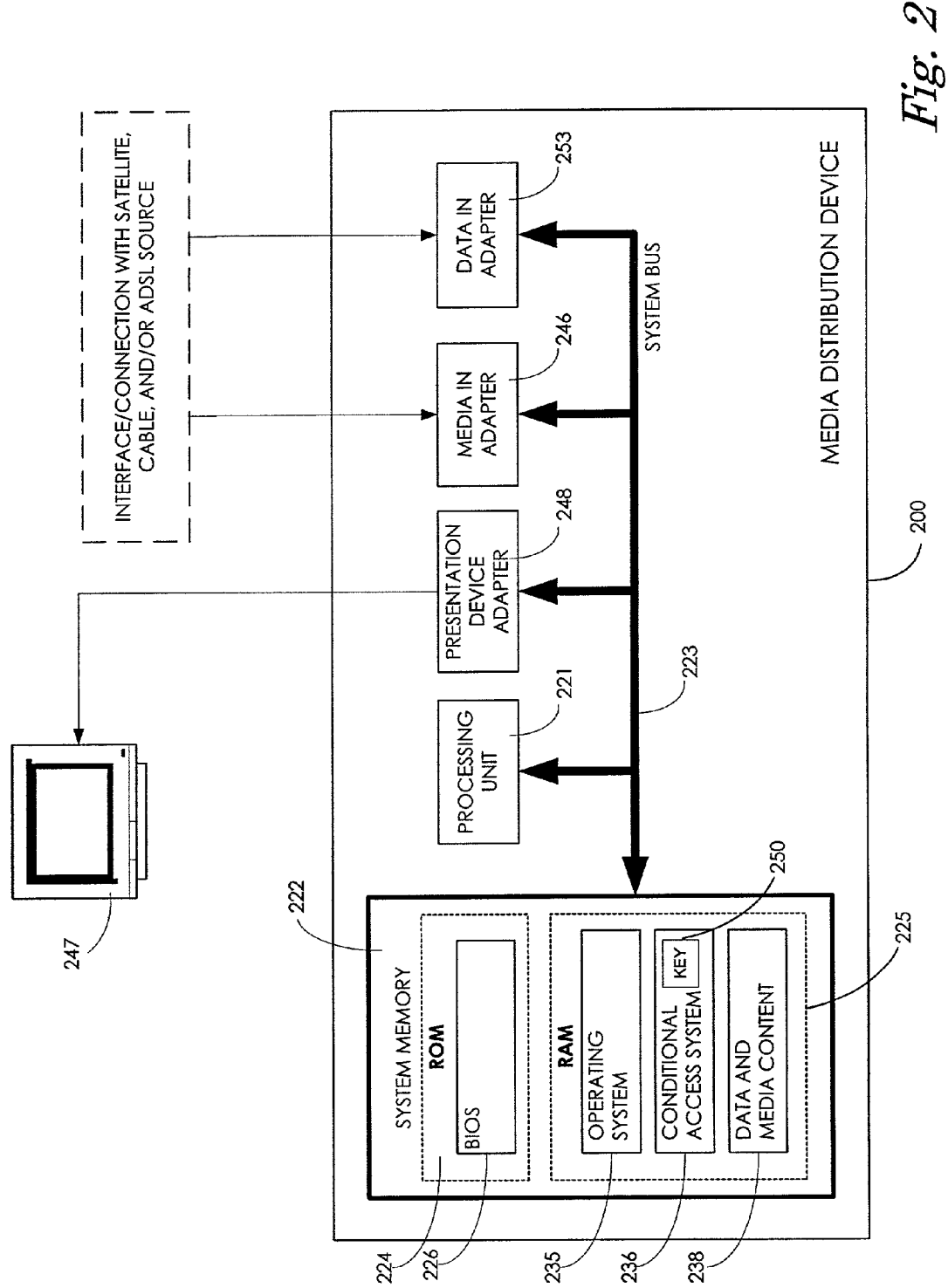
FIG. 2 is a block diagram depicting some of the primary components of an exemplary Media Distribution Device.

FIG. 2 is a block diagram depicting some of the primary components of an exemplary Media Distribution Device. The conventional Media Distribution Device 200 includes a processing unit 221, a system memory 222, and a system bus 223 that couples the system memory to the processing unit. The system memory 222 includes read-only memory (ROM) 224, flash memory (not shown) and random access memory (RAM) 225. A basic input/output system 226 (BIOS) contains rudimentary code to execute basic functions, such as system start-up. The BIOS 226 is stored in the ROM 224. Various program modules may be stored in the RAM 225. Such program modules might include an operating system 235, a conditional access system software module 236 including a key 250, and data and media content 238.

Although not depicted in FIG. 2, the MDD 200 could also include a hard drive, flash memory or other non-volatile memory for long-term storage of program modules such as billing information, the operating system 235, the conditional access system 236, and the data and media content 238. The hard drive may be connected to the MDD 200 via a hard drive interface. Similarly, other peripheral devices could be connected to the MDD with other interfaces not depicted in FIG. 2. Moreover, the MDD could also be equipped with an input device, such as keyboard and/or mouse.

The MDD 200 can also include a video adapter 248 or other adapter for delivery of media content and/or data to a media presentation device 247. The MDD 200 also includes a Media In Adapter 246 and a Data In Adapter 253. These adapters permit connection of the MDD 200 to a communication link for one-way and/or two-way communication with a Media Delivery Service Provider. The Media In Adapter 246 and the Data In Adapter 253 may incorporate a modem and/or other communication device.

The MDD 200 receives media content and data and makes the media content and data available to other internal components by way of internal interfaces such as the system bus 223. The processing unit 221 can route the media content and/or data in accordance with the instructions of the operating system 235 and/or other applications executed in the RAM 225. In addition, the processing unit 221 may store the media content and data in the RAM 225 for subsequent use. The processing unit 221 may also direct the media content and/or data to the media presentation device 247 via the presentation device adapter 248.

The conditional access system 236 may be executed by the processing unit 221 in response to a command received from the Media Delivery Service Provider or any other source. The command may be formatted in accordance with the SNMP protocol. The conditional access system 236 may also be executed in response to a command received from user input, such as a user selecting to view a pay-per-view event, for example.

Figure 3:
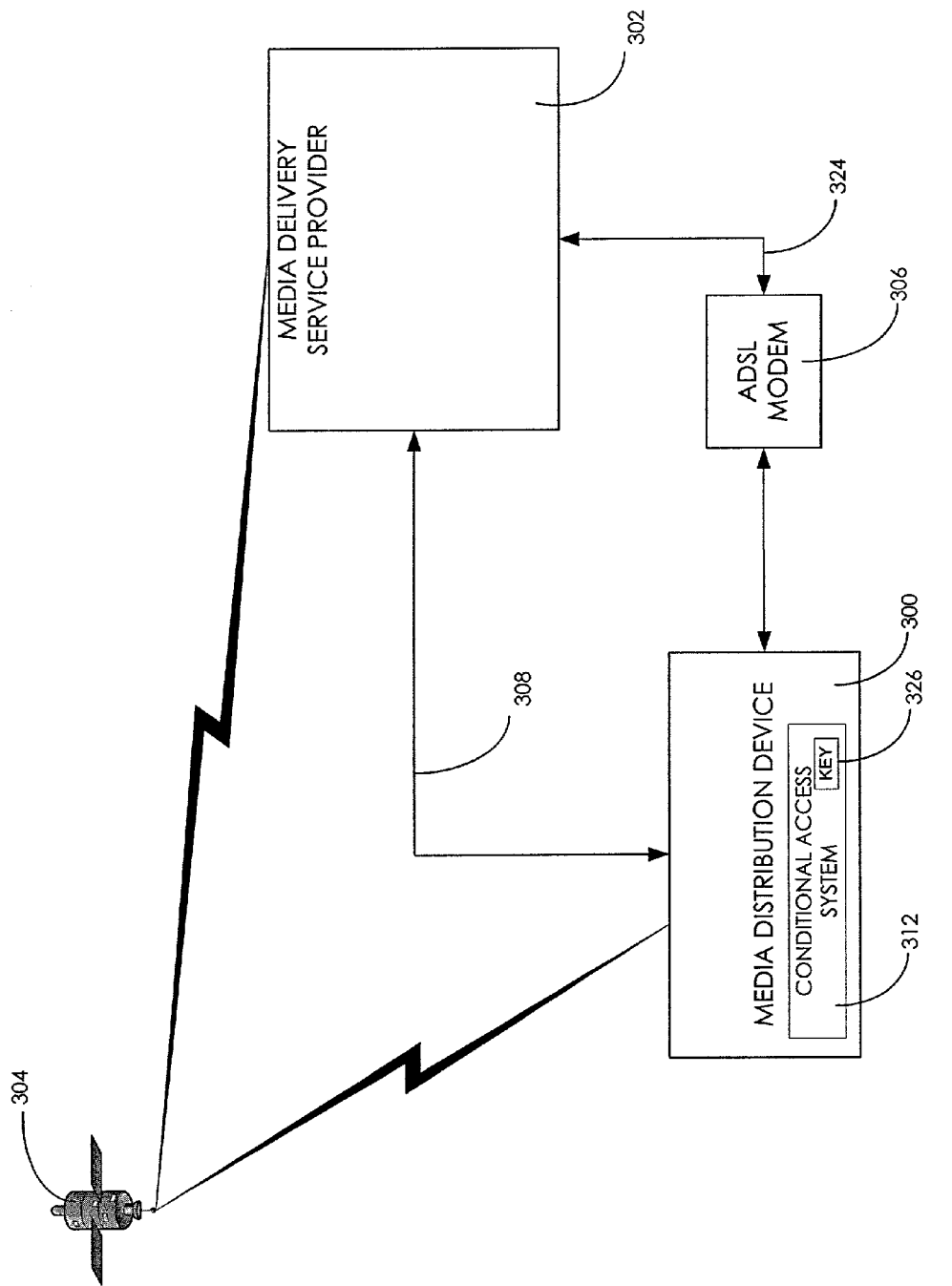
FIG. 3 is a block diagram depicting a media delivery system with a software conditional access system (CAS) in accordance with an exemplary embodiment of the present invention.

FIG. 3 is a block diagram depicting a Media Delivery System with a software conditional access system that is an exemplary embodiment of the present invention. As described above in connection with FIG. 2, the MDD 300 has a resident conditional access system 312.

The Media Delivery Service Provider 302 is operative to communicate with the MDD 300 via the satellite 304, a direct link 308, and/or a DSL modem 306. A broadband connection between the Media Delivery Service Provider 302 and the MDD 300 is preferable, because it permits the Media Delivery Service Provider 310 to communicate with the MDD 300 in real-time and can support an "always-on" connection. Thus, the Media Delivery Service Provider can query for and obtain information related to the MDD 300 within a very short time frame. Because a broadband connection can maintain an always-on status, the Media Delivery Service Provider can autonomously query the MDD 300 during off-peak hours of operation, thereby reducing the impact on system resources.

Although the broadband connection depicted in FIG. 3 is supported by means of an ADSL modem 306, virtually any broadband technology can be used to implement an exemplary embodiment of the present invention. For example, a conventional broadband cable-T.V. connection between the Media Delivery Service Provider 302 and the MDD 300 can be used. Unfortunately, current broadband cable-T.V. protocols are not as secure as an ADSL broadband communication link. Broadband cable-T.V. signals can be intercepted and deciphered, while the communication link between the ADSL modem 306 and the Media Delivery Service Provider 302 can be implemented as a Private Virtual Network that is not shared by other users. Thus, an ADSL broadband connection between the MDD 300 and the Media Delivery Service Provider 302 is preferred to other available broadband connections.

In different embodiments of the invention, the broadband connection 324 may be an xDSL connection, a Data Over Cable Service Interface Specifications (DOCSIS) cable modem connection, a residential gateway connected to an Ethernet port, an IEEE 802.11b (wireless) connection, a Bluetooth connection, or another well-known broadband connection.

In a preferred embodiment, the broadband connection 324 is an ADSL connection and the Media Distribution Device 300 and Media Delivery Service Provider 302 are connected via a permanent virtual circuit (PVC). Asymmetric Digital Subscriber Line (ADSL) is a high speed transmission technology originally developed by Bellcore and standardized by ANSI as T1.413. ADSL typically uses existing unshielded twisted pair (UTP) copper wires from the telephone central office to the user's premises. ADSL modems may be used at the central office and the user's premises to transmit and receive information. A permanent virtual circuit (PVC), or Private Virtual Network (PVN), is a permanent association between two pieces of data equipment established by configuration. A PVC uses a fixed logical channel to maintain a permanent association between two pieces of equipment. Once defined and programmed by the carrier into the network routing logic, all data transmitted between any two points across the network follows a predetermined physical path, making use of a virtual circuit.

One of the advantages of using a PVC is that the Media Distribution Device may be identified based on the PVC. Thus, if the Media Distribution Device is moved to another location, then the service provider will know that it has been moved or cloned and will be able to take appropriate action, such as disconnecting service to prevent fraud.

In another embodiment of the invention, the Media Distribution Device is connected to a broadband infrastructure using a technology such as xDSL at the transport layer. Using a PVC managed by a device such as a Service Gateway, a secured connection is established over a private network to authenticate and authorize Media Distribution Device transactions. Applications may be loaded on the Media Distribution Device as an OSGi bundle. OSGi is the Open Services Gateway Initiative which is an independent, non-profit corporation working to define specifications for the delivery of multiple services over wide-area networks to local networks and devices. An OSGi specification defines an open framework that enables multiple software services to be loaded and run on a services gateway such as a Media Distribution Device, cable modem, DSL modem, PC or dedicated residential gateway. Media Distribution Devices can be authorized in a consumer network by a Residential Gateway (RG). The RG in this implementation becomes a physical layer security device.

In a CATV environment, an IPsec connection may be used rather than a PVC connection. IPsec is a secure version of the Internet Protocol (IP) that provides authentication and encryption at the packet level.

In one embodiment of the invention, the CAS 312 may be used as an access system to determine the media content that may be viewed. For example, a user who has purchased premium movie channels may have a CAS 312 downloaded to their Media Distribution Device. The CAS 312 may include one or more keys 326 that provide decryption for the premium channels. The keys 326 may also be downloaded to provide access to pay-per-view events and the like. The CAS 312 and keys 326 may be updated at any time by the Media Delivery Service Provider via the broadband connection 324. The Media Distribution Device may also upload billing information to the Media Delivery Service Provider in real-time to prevent fraud.

Thus, as should be understood from the foregoing description, the present invention is a software-driven application that eliminates the cost of the hardware CAS and forces immediate billing of all services requested by a consumer on a broadband connected Media Distribution Device.

It should be understood from the foregoing description that the present invention provides greater security than the prior art because it is less likely to be able to hack the software as it was for the smartcards. Also, fixes and updates may be downloaded to the software CAS of the present invention. The present invention eliminates the smartcard required by the prior art, and the replacement of the smart card if conditional access is compromised.

Figure 4:
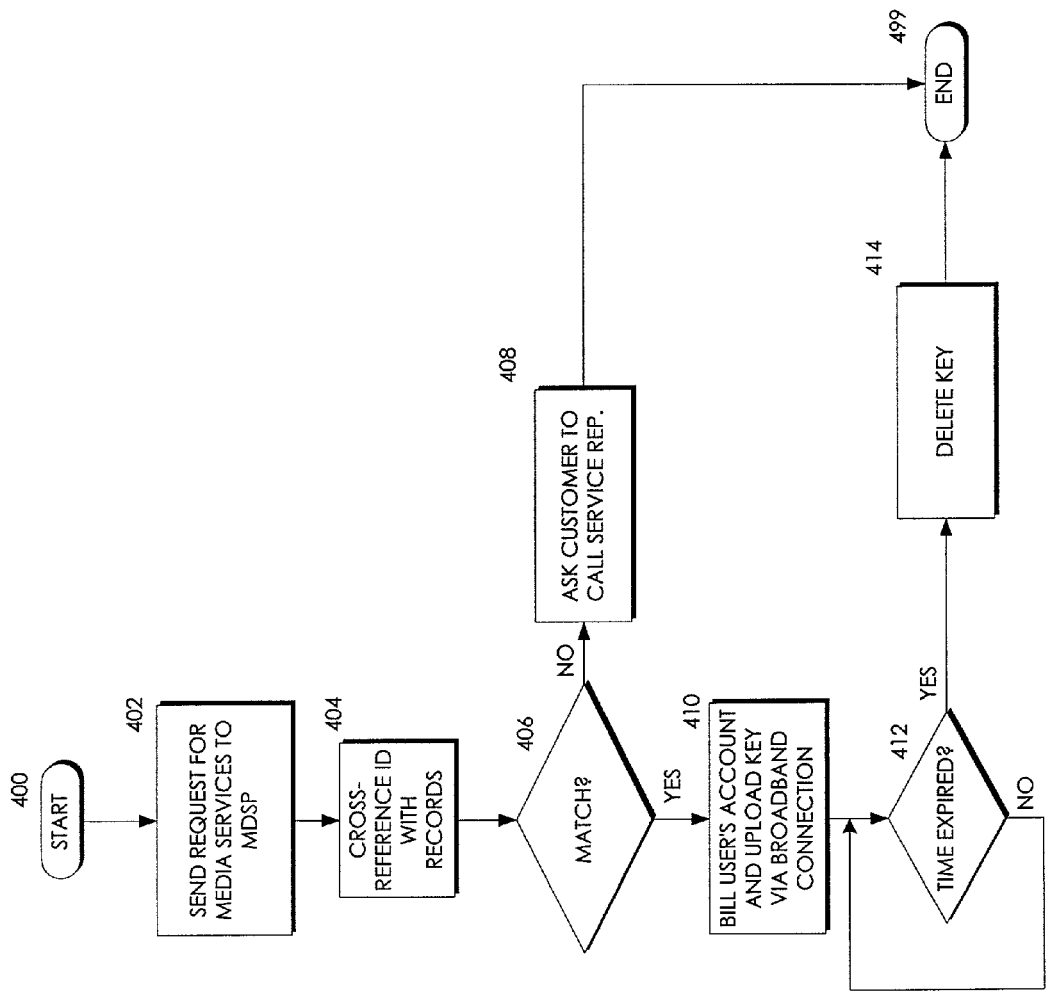
FIG. 4 is a flow chart depicting an exemplary method for purchasing media services using a software conditional access system (CAS) in accordance with an embodiment of the present invention.

FIG. 4 is a flow chart depicting an exemplary method for purchasing media services using a software conditional access system (CAS) in accordance with an embodiment of the present invention. It will be appreciated that the method of FIG. 4 is simply one embodiment of the present invention. Those skilled in the art will appreciate that the method may be used for other communication systems and may be modified to accommodate the various policies of communication system providers.

At step 400, the method begins and a request for media services is sent to the Media Delivery Service Provider via a broadband connection at step 402. For example, the request may be a request to view a pay-per-view event sent from a user's Media Distribution Device via a broadband connection after the user has selected to view the event using the Media Distribution Device or a remote control connected to the Media Distribution Device. A part of the request may be identifying information of the Media Distribution Device. For example, the MAC address of the Media Distribution Device or the hardware serial number of the Media Distribution Device may be sent with the request.

At step 404, the Media Delivery Service Provider cross-references the identifying information with a user's account to determine whether to allow the user to view the media service requested.

At step 406, it is determined whether the identifying information matches a valid customer account and whether to allow the customer to view the requested program. If the Media Delivery Service Provider determines to allow the user to view the requested media service, the user's account (typically maintained by the service provider) is charged and a key is uploaded via the broadband connection to the Media Distribution Device at step 410. Thus, there is no lag time between a user purchasing the media service and the user being charged for the media service. The key may be a software application that allows the user to view the requested media service. For example, the key may be software that is programmed to decrypt the requested media service for viewing. After the requested media service ends, after a predetermined amount of time, etc., the conditional access system of the Media Distribution Device may delete the key. For example, at step 412, it is determined whether the time limit for the media service has expired and if so then the method proceeds to step 414 where the key is deleted and the method ends.

Referring back to step 406, if the identifying information is rejected by the Media Delivery Service Provider, then a request for the customer to call a service representative is uploaded to the Media Distribution Device and displayed to the user at step 408. The method then ends at step 499.

Although the present invention has been described in connection with various exemplary embodiments, those of ordinary skill in the art will understand that many modifications can be made thereto within the scope of the claims that follow. Accordingly, it is not intended that the scope of the invention in any way be limited by the above description, but instead be determined entirely by reference to the claims that follow.

What is claimed is:

1. A method for purchasing a media service from a media delivery service provider, the method comprising:
   sending a request, by an application executing on a computer processor of a media distribution device, to the media delivery service provider requesting a media service;
   authenticating, by the application, the media distribution device by comparing a permanent virtual circuit established between the media distribution device and the media delivery service provider with a predetermined permanent virtual circuit defined and programmed by the media delivery service provider;
   upon determining the media distribution device is authenticated, the application implements:
      downloading a software key from the media delivery service provider to the media distribution device; and
      after a predetermined amount of time, automatically deleting the software key; and
   upon determining the media distribution device is not authenticated:
   downloading displayable data to the media distribution device from the media delivery service provider, the displayable data comprising a displayable request to contact a service representative of the media delivery service provider.

2. The method of claim 1, further comprising:
   determining whether a timer associated with the software key has expired; and
   if so, then deleting the software key.

3. The method of claim 1, further comprising:
   identifying information of the media distribution device; and
   comparing the identifying information to a customer record at the media delivery service Provider, determining whether the customer record indicates a customer is in good standing, and, if so, then determining that the media distribution device is allowed to purchase the media service.

4. The method of claim 1, wherein the permanent virtual circuit comprises a predetermined physical communications path between the media distribution device and a communications component of the media delivery service provider.

5. The method of claim 1, wherein the permanent virtual circuit comprises a communications link utilizing a broadband connection with the media delivery service provider.

6. The method of claim 3, wherein the step of comparing the identifying information to the customer record further comprises matching a hardware serial number of the media distribution device with a registered hardware serial number of the customer record.

7. The method of claim 1, wherein the permanent virtual circuit comprises a communications link utilizing an asymmetric digital subscriber line with the media delivery service provider.

8. A computer program product for purchasing a media service from a media delivery service provider, the computer program product comprising a non-transitory storage medium containing instructions that when executed by a processing circuit perform the steps of:
   sending a request from a media distribution device to a media delivery service provider requesting a media service;
   authenticating the media distribution device by comparing a permanent virtual circuit established between the media distribution device and the media delivery service provider with a predetermined permanent virtual circuit defined and programmed by the media delivery service provider;
   upon determining media distribution device is authenticated:
      downloading a software key from the media delivery service provider; and
      after a predetermined amount of time, automatically deleting the software key; and
   upon determining the media distribution device is not authenticated:
   downloading displayable data to the media distribution device from the media delivery service Provider, the displayable data comprising a displayable request to contact a service representative of the media delivery service provider.

9. The product of claim 8, further comprising an instruction for performing the following:
   if the permanent virtual circuit matches the permanent virtual circuit defined and programmed by the media delivery service provider, then determining whether decryption and presentation aspects of a media service out-of-date, and, if so, updating the decryption and presentation aspects; and if the permanent virtual circuit does not match the permanent virtual circuit defined and programmed by the media delivery service provider, then downloading the displayable data.

10. The product of claim 8, further comprising an instruction for performing the following:
    if the permanent virtual circuit matches the permanent virtual circuit defined and programmed by the media delivery service provider, then determining if the permanent virtual circuit is associated with a customer record in good standing; and
    if the permanent virtual circuit does not match the permanent virtual circuit defined and programmed by the media delivery service provider, then
    downloading the displayable data to the media distribution device from the media delivery service provider, the displayable data comprising a displayable request to contact the service representative of the media delivery service provider.

* * * * *